United States Patent [19]

Matsumoto

[11] Patent Number: 5,184,296

[45] Date of Patent: Feb. 2, 1993

[54] ELECTRONIC TRANSLATOR WITH MULTIPLE SPEED SEARCHING FUNCTION

[75] Inventor: Shinichi Matsumoto, Yokohama, Japan

[73] Assignee: Canon Kabushiki Kaisha, Tokyo, Japan

[21] Appl. No.: 801,587

[22] Filed: Dec. 4, 1991

Related U.S. Application Data

[63] Continuation of Ser. No. 713,606, Jun. 11, 1991, abandoned, which is a continuation of Ser. No. 424,870, Oct. 20, 1989, abandoned.

[30] Foreign Application Priority Data

Oct. 28, 1988 [JP] Japan ............................. 63-270900

[51] Int. Cl.⁵ ........................................... G06F 15/38
[52] U.S. Cl. ..................................................... 364/419
[58] Field of Search ............... 364/419, 900 MS File, 364/200 MS File

[56] References Cited

U.S. PATENT DOCUMENTS

| | | | |
|---|---|---|---|
| 4,117,542 | 9/1978 | Klausner et al. | 364/705.05 |
| 4,464,731 | 8/1984 | Nishimura | 364/419 |
| 4,482,981 | 11/1984 | Morimoto et al. | 364/419 |
| 4,648,070 | 3/1987 | Washizuka | 364/419 |
| 4,720,849 | 1/1988 | Tayama | 379/90 |
| 4,758,977 | 7/1988 | Morimoto et al. | 364/419 |
| 4,829,453 | 5/1989 | Katsuta et al. | 395/155 |

FOREIGN PATENT DOCUMENTS 0108954 7/1982 Japan .
0076965 5/1983 Japan .
0024337 2/1984 Japan .

Primary Examiner—Roy N. Envall, Jr.
Assistant Examiner—David Huntley
Attorney, Agent, or Firm—Fitzpatrick, Cella, Harper & Scinto

[57] ABSTRACT

A translation device for translating words includes a keyboard for entering an input word. Upon entering a word, the device displays a word stored in memory which corresponds to the input word, and its translation. Activation of a search key once intermittently causes the display of the next consecutive word stored in memory, along with its translation. Holding down the search key causes the display of a series of consecutive words stored in memory, bit with no translation. Upon release of the search key, the translation is displayed.

7 Claims, 11 Drawing Sheets

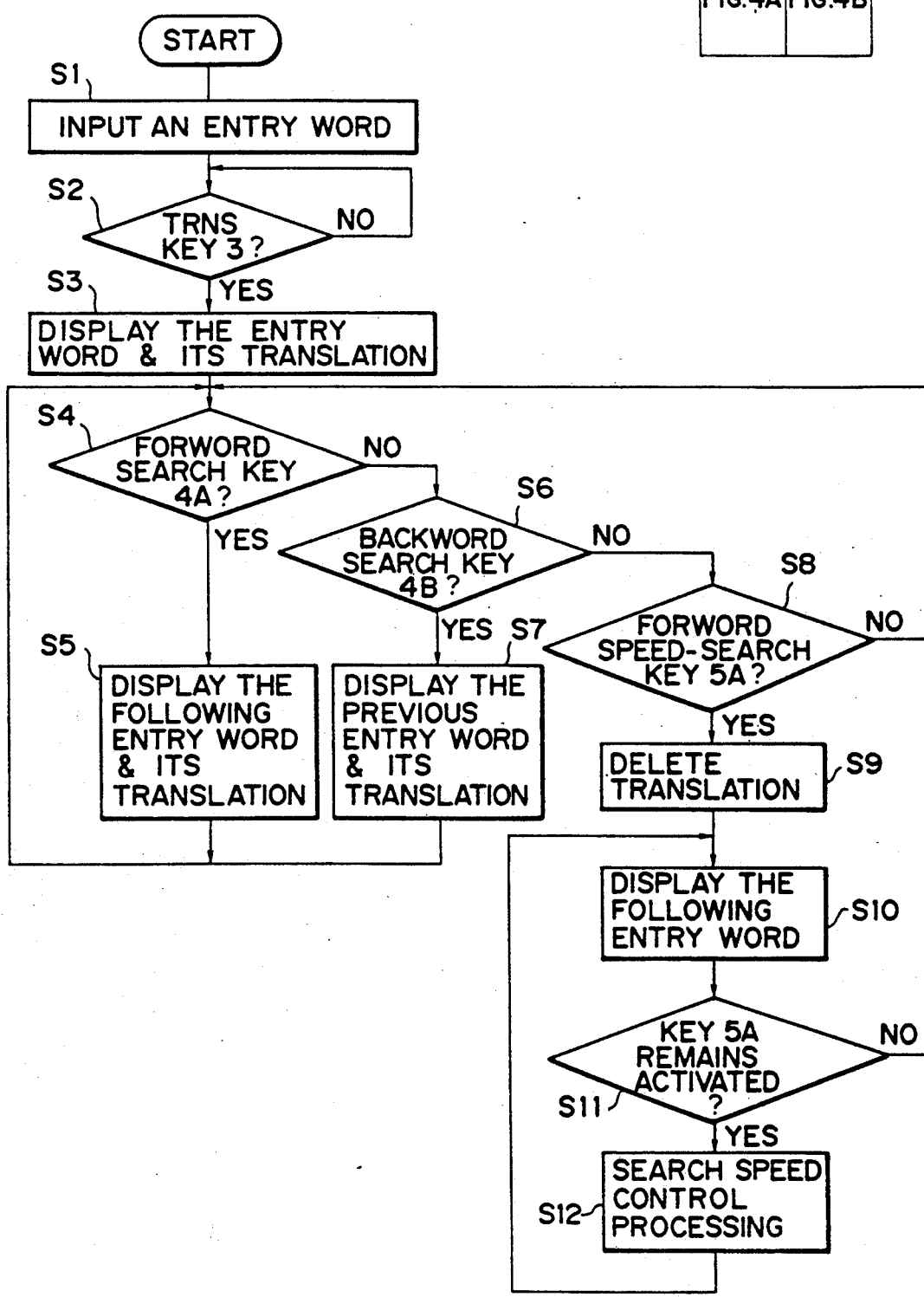

KEY OPERATION          DISPLAY

FIG. 5A    SPEAK         | SPEAK |

21 — SPEAK
22 — 話す, 演説する, 言う

SPEAKER (KEY 5A REMAINS ACTIVATED)    SPECIAL (KEY 5A BECOMES INACTIVATED)
SPECIAL
特別の, 専門の, 臨時の

| | KEY OPERATION | DISPLAY |
|---|---|---|
| FIG. 8A | SPEAK | SPEAK |
| FIG. 8B | TRNS | SPEAK<br>話す, 演説する, 言う |
| FIG. 8C | ▷ | SPEAKER<br>話す人, 演説者, 拡声器,<br>スピーカ |
| FIG. 8D | ▷<br>( KEY 9A REMAINS ACTIVATED ) | SPECIAL |
| FIG. 8E | ▷<br>( KEY 9A REMAINS ACTIVATED ) | SPEECH |
| FIG. 8F | ▷<br>( KEY 9A BECOMES INACTIVATED ) | SPEECH<br>言語, 言葉, 話, 話し方,<br>演説 |

|  | KEY OPERATION | DISPLAY |
|---|---|---|
| FIG.9A | SPEAK | SPEAK |
| FIG.9B | TRNS | SPEAK<br>話す, 演説する, 言う |
| FIG.9C | ▷▷ | 話す人, 演説者,<br>拡声器　スピーカー |
| FIG.9D | ▷▷<br>( KEY 5A REMAINS ACTIVATED ) | 特別の, 専門の,<br>臨時の |
| FIG.9E | ▷▷<br>( KEY 5A BECOMES INACTIVATED ) | SPECIAL<br>特別の, 専門の,<br>臨時の |

| | KEY OPERATION | DISPLAY |
|---|---|---|
| FIG.10A | あいえんきえん | あいえんきえん |
| FIG.10B | TRNS | あいえんきえん<br>意 気心の合う合わないがあり、縁はふしぎだ。 |
| FIG.10C | ▷▷ | いきようよう |
| FIG.10D | ▷▷<br>( KEY 5A REMAINS ACTIVATED ) | いちもうだじん |
| FIG.10E | ▷▷<br>( KEY 5A BECOMES INACTIVATED ) | いちもうだじん<br>意 一度に悪者たちをつかまえてしまうこと。 |

ELECTRONIC TRANSLATOR WITH MULTIPLE SPEED SEARCHING FUNCTION

This application is a continuation of prior application, Ser. No. 07/713,606 filed June 11, 1991, which application is a continuation of prior application Ser. No. 07/424,870 filed Oct. 20, 1989, both now abandoned.

BACKGROUND OF THE INVENTION

1. Field of the Invention

The present invention relates to electronic apparatus such as word processors and translation machines having an electronic dictionary.

2. Background Art Related

Recently, there have been developed various apparatus of the above mentioned type such as general purpose apparatus, personal computers and the like. Various types of methods of searching a word from a dictionary are also known.

A dictionary in an apparatus is used for finding the correct spelling of a word an operator does not know or of which he is uncertain, or for searching a word by inputting the first few characters thereof. With an apparatus having a dictionary, during a translation operation after inputting the certain entry word, a word most similar to the entry word is searched from the dictionary, and translated. If a key on a keyboard of the apparatus remains activated by being continuously depressed, similar words and their translation equivalents are sequentially displayed in the stored order of words in the dictionary. Upon releasing the key the display of the entry word and its translation equivalents at that time are displayed.

The display of an apparatus of this type is made large so as to display a large amount of information at one time. On the other hand, it is also desirable to make the apparatus small. Used as a power source are a button battery, SUN-3 battery or the like having a small current capacity. Since the frequency of a system clock has a limit in dependence on the current capacity and battery life, the speed at which a word is searched and displayed is restricted to a certain limited value, resulting in the problem that the forward or backward search speed cannot be made faster.

SUMMARY OF THE INVENTION

A first object of the present invention is to provide an electronic apparatus capable of efficiently searching words even with a battery of a small capacity.

A second object of the present invention is to provide an electronic apparatus capable of changing the speed of searching words upon instruction by a key input.

A third object of the present invention is to provide an electronic apparatus capable of efficiently searching words with a simple operator manipulation.

BRIEF DESCRIPTION OF THE DRAWINGS

FIG. 4, which comprises FIG. 4(a) and FIG. 4(b), is a flow chart showing an example of the search procedure stored in ROM 7;

FIGS. 5A to 5E illustrate examples of key inputs and displayed words according to the first embodiment;

FIGS. 8A to 8F illustrate examples of key inputs and displayed words according to the second embodiment;

FIGS. 9A to 9E illustrate examples of key inputs and displayed words according to a third embodiment; and FIGS. 10A to 10E illustrate examples of key inputs and displayed words according to a fourth embodiment.

DETAILED DESCRIPTION OF THE EMBODIMENTS

The embodiments of the present invention will be described in detail with reference to the accompanying drawings.

1st Embodiment

Figure 1:
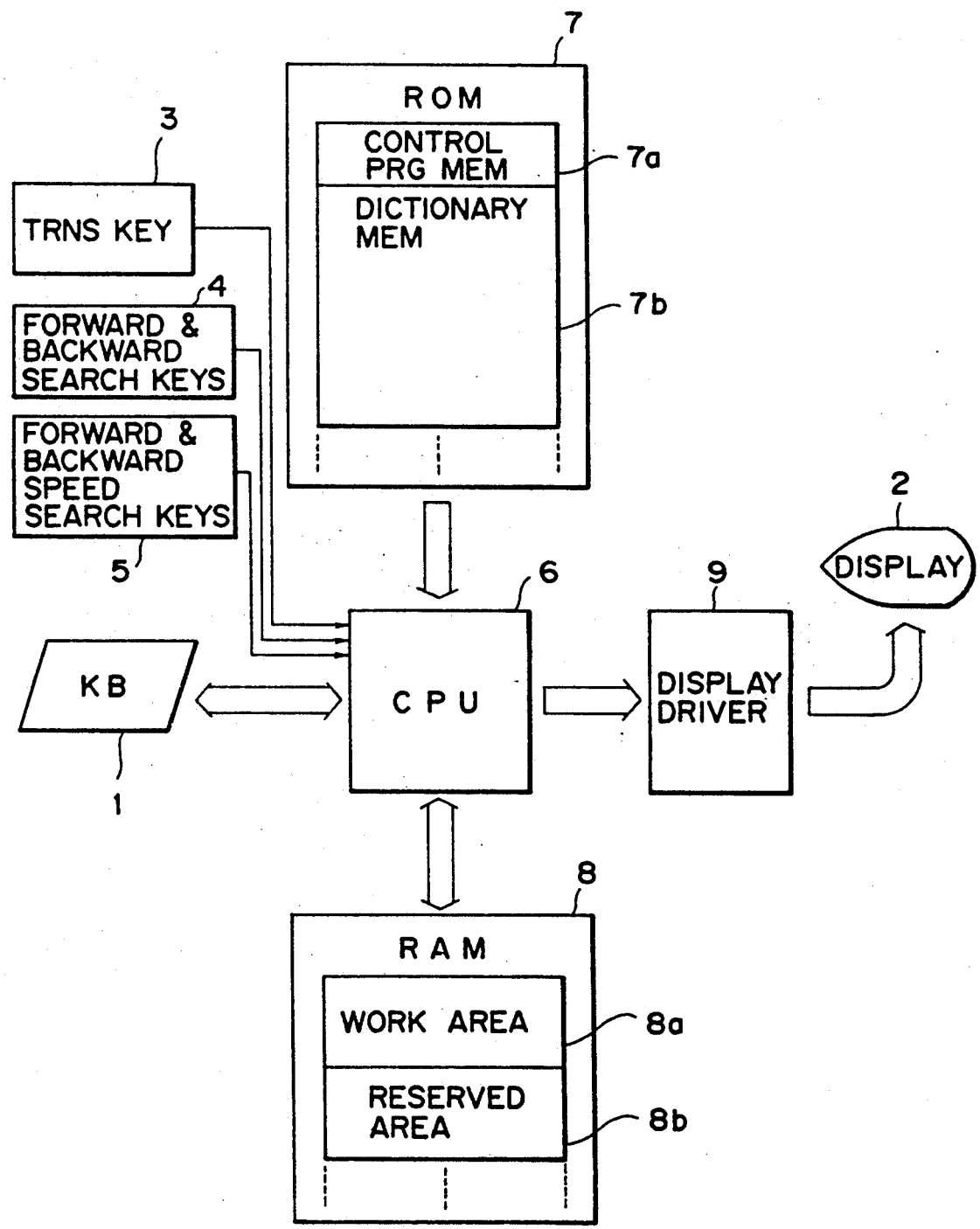
FIG. 1 is a block diagram showing a first embodiment of the electronic apparatus according to the present invention.

Referring to FIG. 1, characters representing letters of an entry word are entered upon depression of letter keys on a keyboard 1. The inputted letters forming an entry word and its translation equivalents, i.e., Japanese words, are displayed on a display 2. A translation key 3 is used for entering an instruction to search from a dictionary an English word of inputted letters or an English word most similar to the inputted letters.

Forward and backward search keys 4 are depressed to enter a forward direction (4A) or backward direction (4B). Release of the forward and backward keys instructs the apparatus to display an entry word and its Japanese translation equivalents at that time. Depression of backward and forward speed-search keys 5 instructs the apparatus to search words in the forward direction (5A) or in the backward direction (5B) at predetermined time intervals.

When a search instruction is entered by the translation key 3, a CPU 6 controls the apparatus to search from the dictionary the letters or the entry word inputted from the keyboard 1. While the speed-search key 5 is being depressed, CPU 6 controls the apparatus to sequentially display entry words on the display 2 in the stored order of entry words in the dictionary. Upon release of the speed-search key 5, the entry word at that time and its translation equivalents continue to be displayed.

A control program memory 7a in ROM 7 stores therein control programs such as error processing programs and search programs. A dictionary memory 7b stored therein English words and their Japanese translation equivalents. A work area in a RAM 8 stores therein various programs, and a reserved area 8b is used as a temporary save area during error processing. A display driver 9 drives the display 2.

Figure 2:
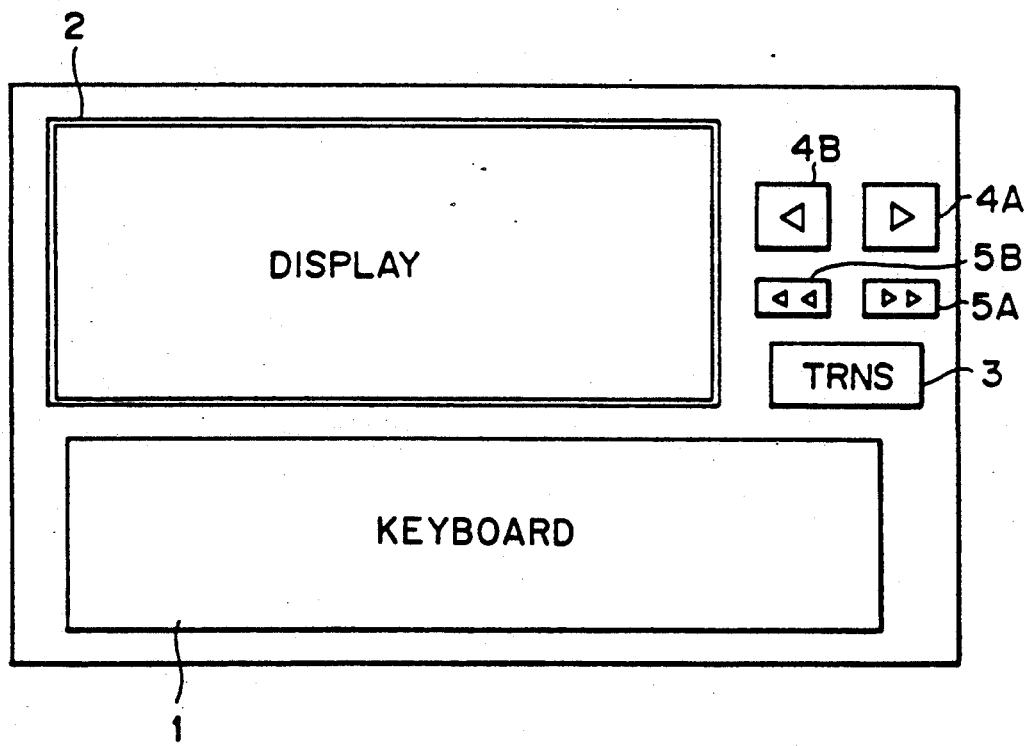
FIG. 2 is a plan view of an operation panel disposed on which are the keyboard 1, a display 2, a translation key 3, a forward/backward search keys 4, and speed-search keys 5, respectively, shown in FIG. 1.

FIG. 2 shows the disposition on the operation panel of the keyboard 1, the display 2, translation key 3, forward search key 4A, the backward search key 4B, the forward speed-search key 5A, the backward speed-search key 5B, respectively, shown in FIG. 1.

Figure 3:
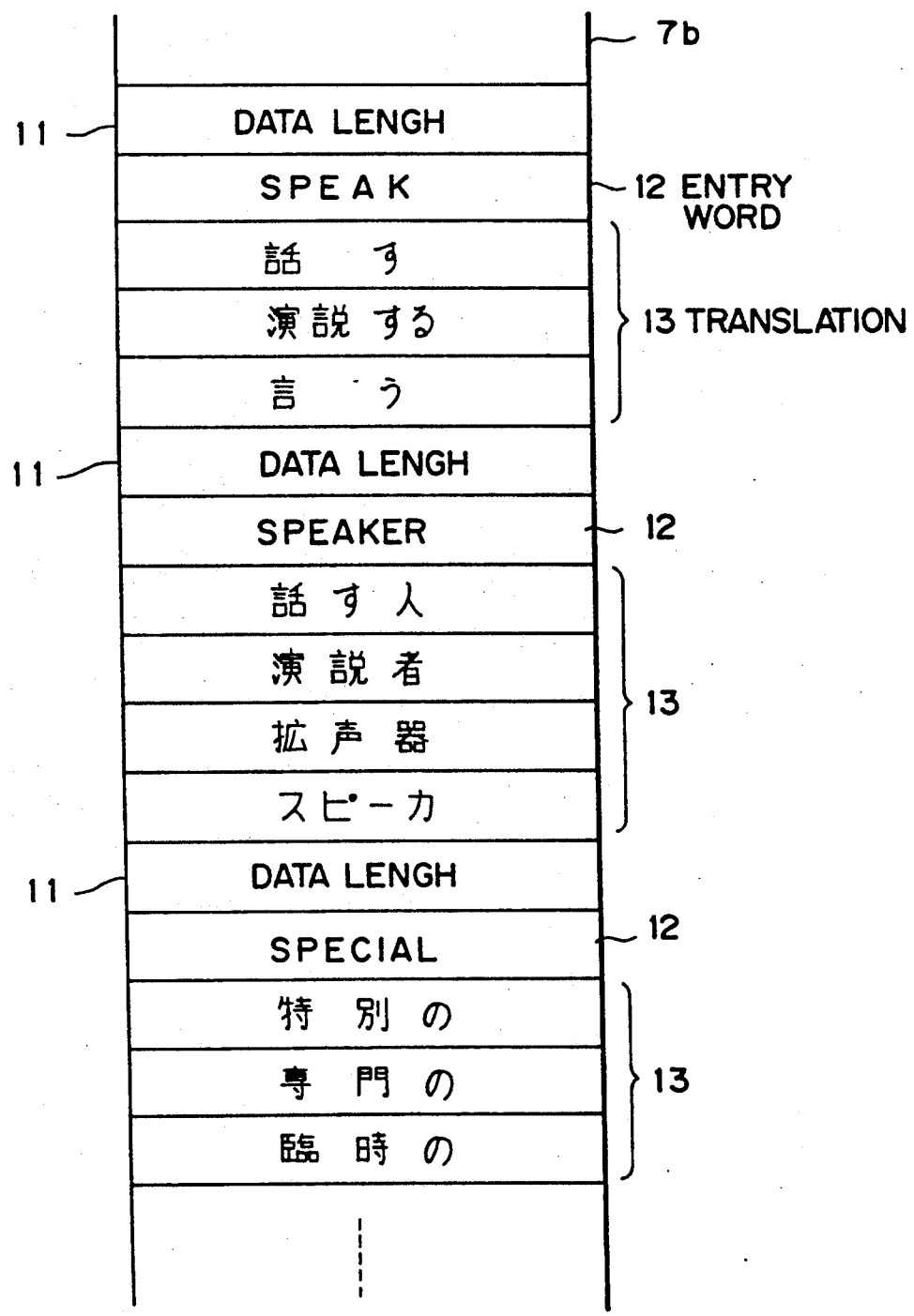
FIG. 3 shows an example of words stored in the dictionary memory 7b.

FIG. 3 shows an example of entry words and their translation equivalents stored in the dictionary memory 7b. The dictionary memory 7b is constructed of a data length storage area 11, a entry word storage area 12, and a translation equivalent storage area 13. Stored in the data length storage area 11 is the total data length of the data length of pairs of stored entry words (English words) and their translation equivalents (Japanese words), and the data length used for storing the first-mentioned data length. Stored in the entry word storage area 12 are English entry words. Stored in the translation equivalent storage area are translation equivalents (Japanese words) to the entry words (English words) stored in the entry word storage area 12.

Consider by way of example an English word n"SPEAK" to be translated. An entry word "SPEAK" is stored in the entry word storage area 12, and "話す"(to talk with another), "演説する"(to deliver an address), and "言う"(to utter words) corresponding to the translation equivalents to the entry word "SPEAK" are consecutively stored in the translation equivalent storage area 13. Stored in the data length storage area 11 is the total data length from the data length storage area 11 of the entry word "SPEAK" to the last translation equivalent in the translation equivalent storage area 13.

The same memory arrangement is used for the case of entry words "SPEAKER" and "SPECIAL".

FIG. 4 is a flow chart showing an example of the search procedure stored in ROM 7.

At step S1, an entry word to be translated is entered from the keyboard 1. If the translation key 3 is depressed at step S2, then at step S3 the inputted entry word or an entry word most similar to the inputted entry word, and its translation equivalents are searched from the dictionary memory 7b, the searched entry word and its translation equivalents are displayed on the display 2 at the same time, and thereafter a key input is awaited. It is checked at step S4 if the forward search key 4A was depressed. If it was depressed, the next entry word with respect to the presently displayed entry word is searched at step S5 from the dictionary memory 7b, and the searched entry word and its translation equivalents are displayed, to thereafter return to step S4. If the forward searching 4A was not depressed at step S4, then it is checked at step S6 if the backward search key 4B was depressed. If it was depressed, the previous entry word and its translation equivalents are displayed at step S7, to thereafter return to step S4.

If the backward search key 4B is not depressed at step S6, then it is checked at step S8 if the forward speed-search key 5A was depressed. If it was depressed, the displayed translation equivalents are erased at step S9, and the next entry word is displayed at step S10, to thereafter advance to step S11. It is checked at step S11 if the key 5A remains activated or not. If the key 5A remains activated, a search speed control processing is performed at step S12 for the period until a timer counts up so that entry words are displayed at a visually proper speed. After step S12, the flow returns to the next entry display step S10. If the depression of the forward speed-search key 5A is released at step S11, the entry word and its translation equivalents at that time are displayed at step S13, to thereafter return to step S4.

If the forward speed-search key 5A is not depressed at step S8, then at step S14 it is checked if the backward speed search key 5B was depressed. If it was depressed, in the same manner as the case of the depression of the forward speed-search key 5A, the presently displayed translation equivalents are erased at step S15. At step S16, the previous entry word before the presently displayed entry word is displayed at step S16. Then, at step S17 it is checked if the backward speed-search key 5B remains activated. If the key 5B remains activated, the search speed control processing is performed at step S18. After the timer counts up, the flow returns to step S16. If the depression of the key 5B is released at step S17, then the entry word and its translation equivalents at that time are displayed at step S19, to thereafter return to step S4.

If the backward speed-search key 5B is not depressed at step S14, then at step S20 it is checked if the clear processing was performed or not. If the clear processing was performed, the apparatus waits for the input of an entry word from the keyboard.

Next, the procedure from step S8 to step S13 will be described in more detail.

Figure 5B:
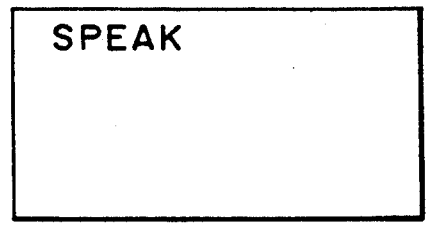
Figure 5C:
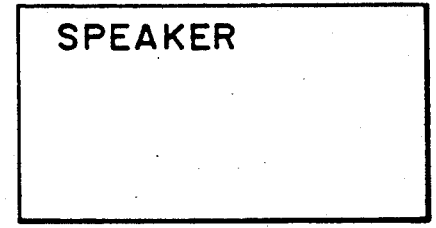
Figure 5D:
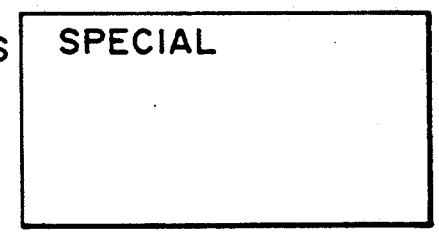
Figure 5E:
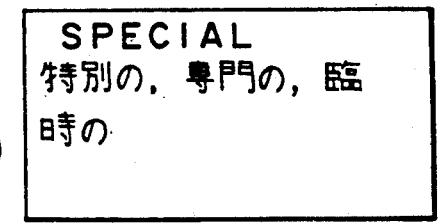

Upon actuation of the alphabet keys "S", "P", "E", "A" and "K" at step S1, a word "SPEAK" is entered so that the word "SPEAK" is displayed on the display 2 at the entry word area 21 (refer to FIG. 5A). Upon depression of the translation key 3 at step S2, the inputted entry word "SPEAK" is searched from the dictionary to thereby display the translation equivalents to the entry word "SPEAK" on the translation equivalent area 22 (refer to FIG. 5B). Upon depression of the forward speed-search key 5A at step S8, the Japanese translation equivalents "話す"(to talk with another), "演説する"(to deliver an address) and "言う"(to utter words) displayed on the translation equivalent area 22 (refer to FIG. 5B) are erased, and the next entry word "SPEAKER" is displayed on the entry word area 22 (refer to FIG. 5C). If the forward speed-search key 5A remains activated at step S11, the next entry word "SPECIAL" is displayed on the entry word area 21 (refer to FIG. 5D). If the depression of the forward speed-search key 5A is released, Japanese translation equivalents "特殊の"(unique), "特別の"(for a particular purpose) and "格別の"(not regular) to the entry word "SPECIAL" displayed at that time are searched from the dictionary and displayed on the translation equivalent area.

If the backward speed-search key 5B is depressed, the order of displaying entry words on the entry area 21 is reversed.

2nd Embodiment

Figure 6:
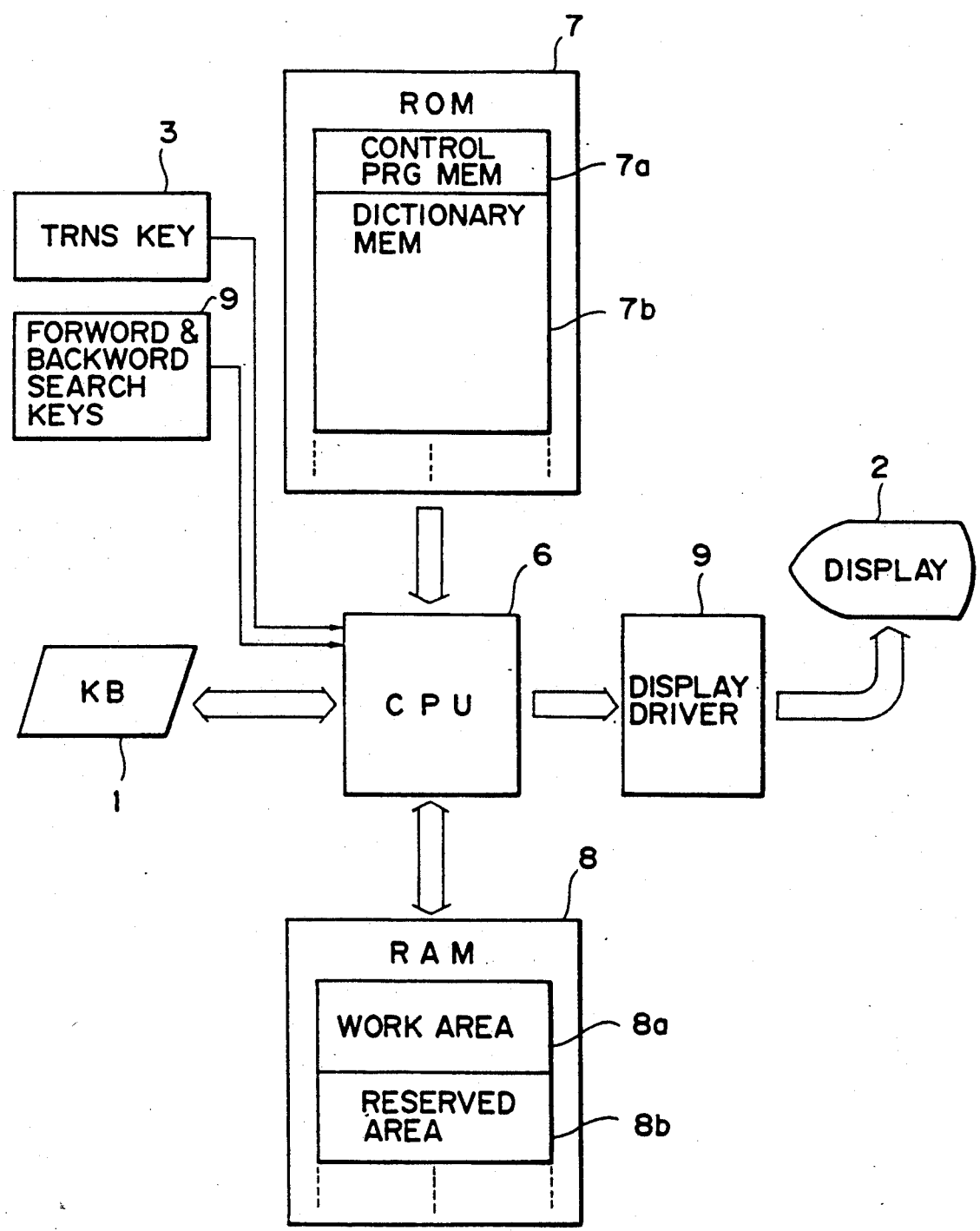
FIG. 6 is a block diagram showing a second embodiment of the electronic apparatus according to the present invention.

FIG. 6 shows the second embodiment of this invention. In this embodiment, if forward or backward search keys 9A and 9B are depressed once, the ordinary forward or backward search is entered, whereas if it remains depressed, entry words are displayed forward or backward at predetermined time intervals in the same manner as of the speed-search key 5. This embodiment has essentially the same function and advantage as the first embodiment.

Figure 7:
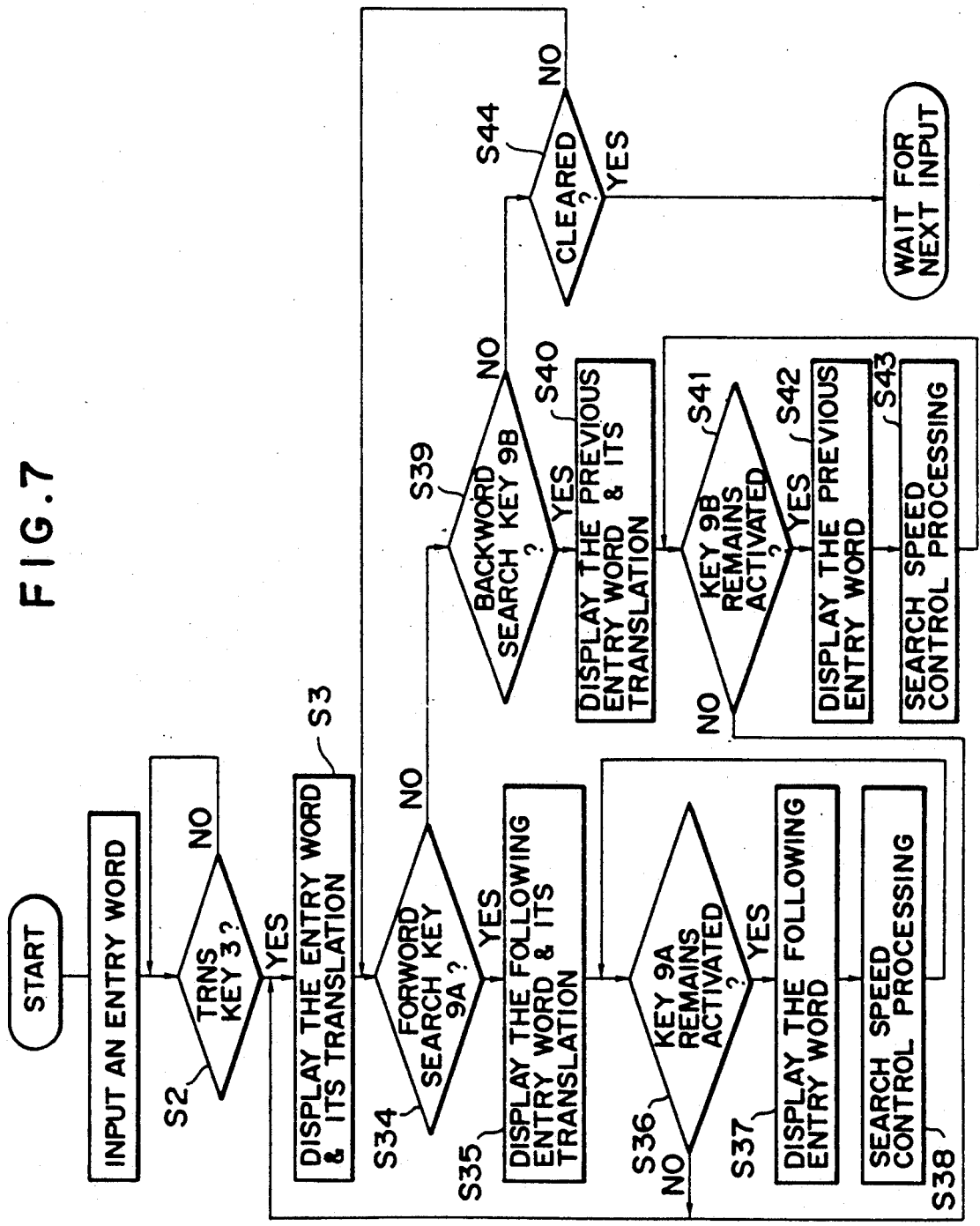
FIG. 7 is a flow chart showing an example of the search procedure stored in ROM 7 of the second embodiment.

FIG. 7 shows an example of, the search procedure stored in ROM 7. Steps S1 to S3 are the same procedures as that shown in FIG. 4. Upon depression of the forward search key 9A during the key input wait state at step S34, the next entry word and its translation equivalents are displayed at step S35 respectively at the entry word area and translation equivalent area, to thereafter advance to step S36. It is checked at step S36 if the key 9A remains activated. If the key 9A remains activated, the speed search processing is performed at step S37 to display the next entry word at the entry word area. The search speed control processing is performed at step S38, to thereafter return to step S36. If key 9A does not remain activated at step S36, the flow returns to step S3. If the forward search key 9A is not depressed at step S34, it is checked at step S39 if the backward search key 9B was depressed. If depressed, the procedure from step S40 to S43, essentially the same as that of the forward search key input, is performed. If the backward search key 9B is not depressed at step S39, it is checked at step S44 if the clear processing was performed. If not, the flow returns to step S34. If clear processing was performed, the apparatus waits for the input of the next entry word.

FIG. 8 shows an example of a key operation and corresponding display.

FIG. 8A shows a display when an entry word "SPEAK" is inputted, and FIG. 8B shows an example of a display when the translation key 3 is depressed. FIG. 8C shows an example of a display when the forward search key 9A is depressed, wherein the next entry word "SPEAKER" and its translation equivalents are displayed. FIG. 8D shows an example of the next entry word displayed when the forward search key 9A remains activated. FIG. 8E shows an example of the further next entry word when the forward search key 9A still remains activated. FIG. 8F shows an example of a display when the depression of the forward search key 9A is released.

3rd Embodiment

In this embodiment, translation equivalents only are displayed during the speed-search operation. FIG. 9 shows an example of a key operation and corresponding display. FIG. 9A shows an example of a display when an entry work "SPEAK" is entered, and FIG. 9B shows an example of a display when the translation key 3 is depressed. FIG. 9C shows an example of a display of translation equivalents to the next entry word "SPEAKER" when the speed-search key 5A is depressed. FIG. 9D shows an example of translation equivalents to the further next entry word when the speed-search key 5A remains activated. FIG. 9E shows an example of a display of an entry word and its translation equivalents when the depression of the speed-search key 5A is released.

4th Embodiment

In this embodiment, a searched entry word is displayed together with its definition.

FIG. 10 shows a key operation and corresponding display. FIG. 10A shows a display when a Japanese word "おもいがけない"(unexpected relation) is entered. FIG. 10B shows an example of a definition displayed a the transmission equivalent area when the translation key 3 is depressed. FIG. 10C shows an example of a display of the next entry word when the speed-search key 5A is depressed. FIG. 10D shows an example of a display of the further next entry word when the speed-search key 5A remains activated. FIG. 10E shows an example of a display of the entry word "いちもうだじん" (make a wholesale arrest) and its definition displayed when the depression of the speed-search key 5A is released.

I claim:

1. An electronic apparatus comprising:
  input means for inputting words;
  memory means for storing data representing a plurality of words consecutively in said memory means and corresponding to the inputted words and for storing data representing a plurality of corresponding words corresponding to said data representing said plurality of words;
  display means for displaying a word inputted by said input means and a corresponding word, from said memory means, represented by data corresponding to data representing a word stored in said memory means corresponding to said inputted word;
  instruction means for generating a first or second instruction instructing the reading of data representing a consecutive word consecutively stored in said memory means relative to said word displayed on said display means, and instructing the display of said consecutive word on said display means in place of the previously displayed word;
  first control means for controlling said display means to display the consecutive word read from said memory means while the first instruction is being generated by said instruction means; and
  second control means for controlling said display means to display the consecutive word read from said memory means while the second instruction is being generated by said instruction means, and for, while the second instruction by said instruction means is not being generated, searching said memory means for data representing a corresponding word corresponding to the consecutive word then displayed on said display means, and controlling said display means to display the searched corresponding word;
  wherein said data representing a word stored in said memory means represents a word in a first language, and said data representing a corresponding word represents a word in a second language or a definition of the word in the first language.

2. An electronic apparatus according to claim 1, wherein said instruction means comprises forward search instruction means for generating on instruction instructing the display of a next word next in said memory means with respect to said word presently displayed on said display means, in place of said presently displayed word; and backward search instruction means for generating an instruction instructing the display of a previous word previous, in said memory mean, with respect to said word presently displayed on said display means, in place of said presently displayed word.

3. An electronic apparatus according to claim 1, wherein said first language is English and said second language is Japanese.

4. An electronic apparatus comprising:
  input means for inputting words;
  memory means for storing data representing a plurality of words consecutively in said memory means and corresponding to the inputted words and for storing data representing a plurality of corresponding words corresponding to said data representing said plurality of words;
  display means for displaying a word inputted by said input means and a corresponding word, from said memory means, representing by data corresponding to data representing a word stored in said memory means corresponding to said inputted word;
  instruction means for generating a first or second instruction; and
  control means for controlling said display means to display a next word in said memory means, next with respect to a presently displayed word, and a corresponding word corresponding thereto when said instruction means is operated to generate the first instruction, and to sequentially display consecutive words when said instruction means is operated to generate the second instruction continuously, and for then searching said memory means for the corresponding word corresponding to the word displayed on said display means at the end of the continuous operation of said instruction means and for controlling said display means to display the searched corresponding word when the continuous operation of said instruction means is ended;

wherein said data representing a word stored in said memory means represents a word in a first language, and said data representing a corresponding word represents a word in a second language or a definition of the word in the first language.

5. An electronic apparatus to claim 4, wherein said first language is English and said second language is Japanese.

6. An electronic apparatus comprising:

input means for inputting words:

memory means for storing data representing a plurality of words consecutively in said memory means and corresponding to inputted words and for storing data representing a plurality of corresponding words corresponding to said data representing said words;

display means for displaying a word inputted by said input means and a corresponding words, from said memory means, represented by data corresponding to said data representing a word stored in said memory means corresponding to said inputted word;

instruction means for generating a first or second instruction; and control means for controlling said display means to display a next word in said memory means, next with respect to a presently displayed word, and a corresponding word corresponding thereto when said instruction means is operated to generate the first instruction, and to sequentially display corresponding words corresponding to consecutive words when said instruction means is operated to generate the second instruction continuously, and for controlling said display means to display the word corresponding to the corresponding word displayed on said display means at the end of the continuous operation of said instruction means when the continuous operation of said instruction means is ended;

wherein said data representing a word stored in said memory means represents a word in a first language, and said data representing a corresponding word represents a word in a second language or a definition of the word in the first language.

7. An electronic apparatus according to claim 4, wherein said first language is English and said second language is Japanese.

* * * * *

UNITED STATES PATENT AND TRADEMARK OFFICE
CERTIFICATE OF CORRECTION

PATENT NO. : 5,184,296　　　　　　　　Page 1 of 2
DATED : February 2, 1993
INVENTOR(S) : SHINICHI MATSUMOTO It is certified that error appears in the above-identified patent and that said Letters Patent is hereby corrected as shown below:

IN THE ABSTRACT [57]
　　Line 9, "bit" should read --but--.

IN SHEET 4 OF THE DRAWINGS

Figure 4A
　　In steps S4 and S8, "FORWORD" should read --FORWARD-- (both occurrences), and in step S6, "BACKWORD" should read --BACKWARD--.

IN SHEET 5 OF THE DRAWINGS

Figure 4B:
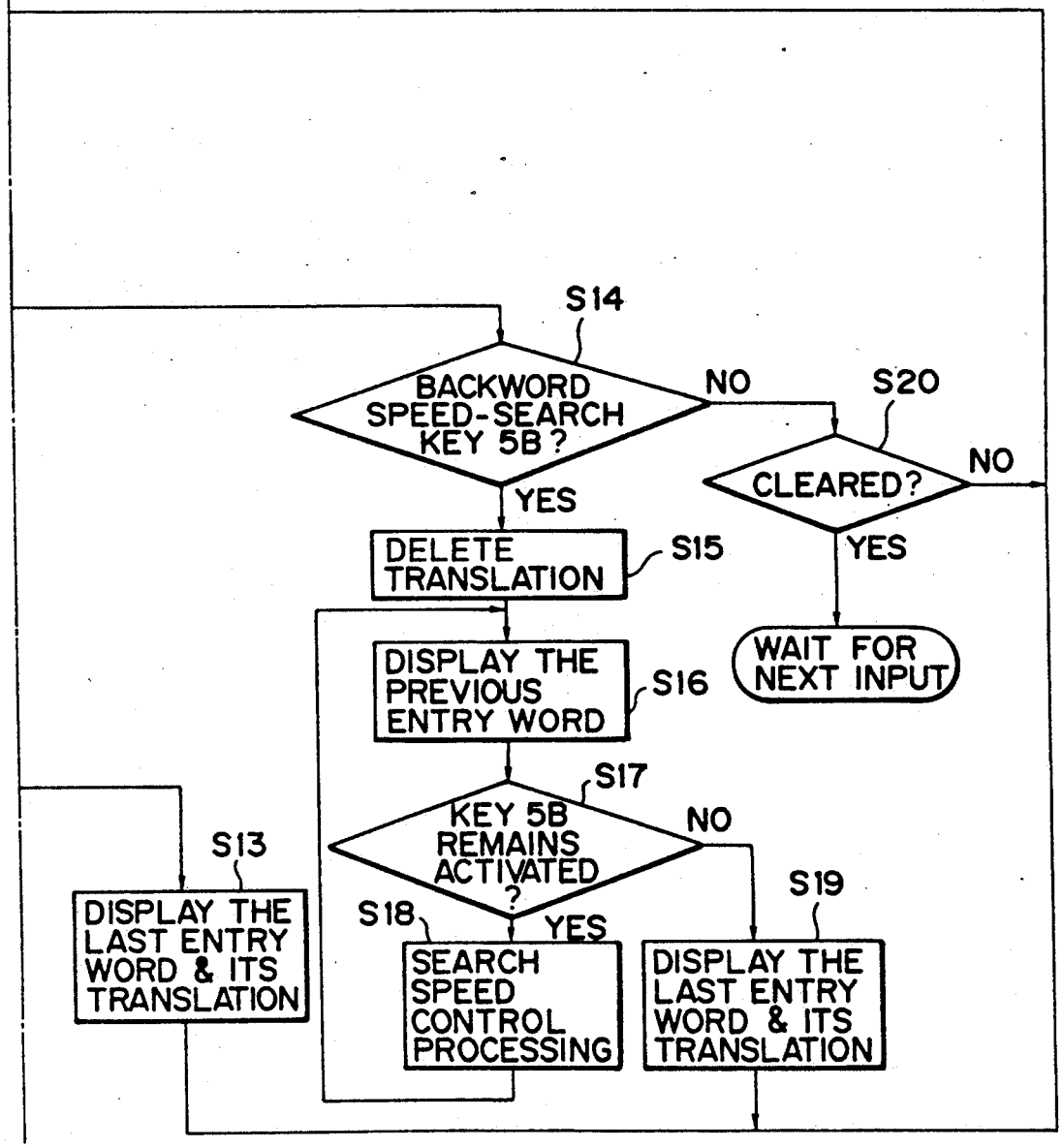

Figure 4B
　　In step S14, "BACKWORD" should read --BACKWARD--.

IN SHEET 7 OF THE DRAWINGS

Figure 6
　　In box 9, "FORWORD & BACKWORD" should read --FORWARD & BACKWARD--.

IN SHEET 8 OF THE DRAWINGS

Figure 8
　　In step S34, "FORWORD" should read --FORWARD--.
　　In step S39, "BACKWORD" should read --BACKWARD--.

COLUMN 1
　　Line 26, "a" should read --the--.

COLUMN 2
　　Line 62, "3, for-" should read --3, the for--.

UNITED STATES PATENT AND TRADEMARK OFFICE
CERTIFICATE OF CORRECTION

PATENT NO. : 5,184,296
DATED : February 2, 1993
INVENTOR(S) : SHINICHI MATSUMOTO It is certified that error appears in the above-identified patent and that said Letters Patent is hereby corrected as shown below:

COLUMN 3
    Line 1, "a" should read --an--.
    Line 13, "n "SPEAK"" should read --"SPEAK"--.

COLUMN 4
    Line 32, "step S11 ," should read --step S11,--.
    Line 54, "of," should read --of--.

COLUMN 5
    Line 16, "depressed,." should read --depressed,--.

COLUMN 6
    Line 14, "word read" should read --word and a corresponding word corresponding to the consecutive word read--.
    Line 41, "mean," should read --means,--.

COLUMN 7
    Line 14, "apparatus" should read --apparatus according--.
    Line 18, "words:" should read --words;--.

COLUMN 8
    Line 25, "claim 4," should read --claim 6,--.

Signed and Sealed this

Twenty-fourth Day of May, 1994

Attest:

BRUCE LEHMAN

*Attesting Officer*    Commissioner of Patents and Trademarks